M. B. LLOYD.
WELDING DEVICE.
APPLICATION FILED FEB. 23, 1917.
1,293,486. Patented Feb. 4, 1919.
3 SHEETS—SHEET 3.
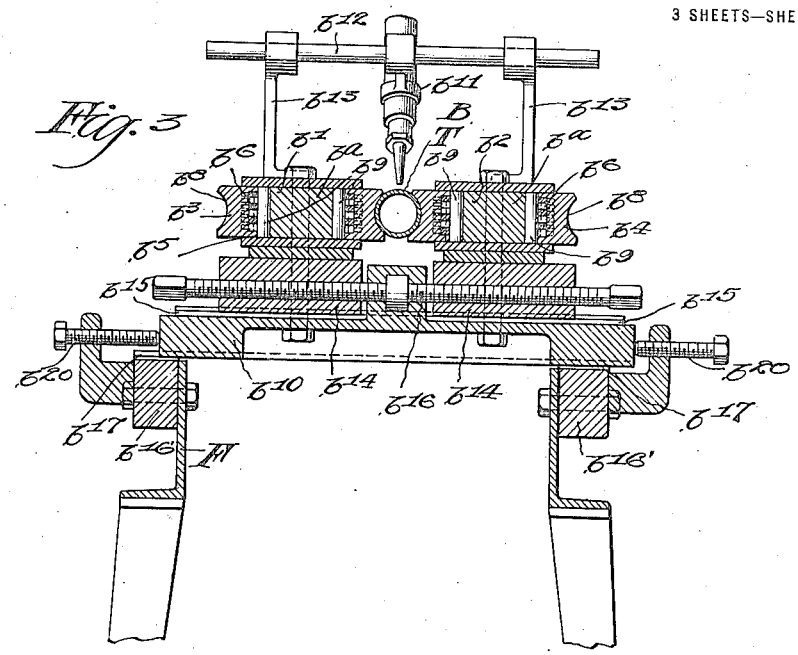
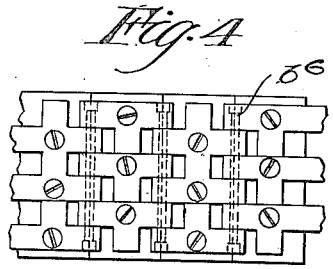
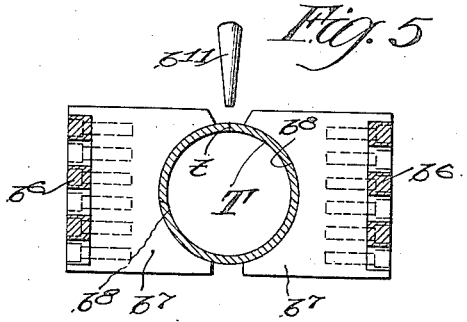
Witnesses:
Inventor:
Marshall B. Lloyd
By:
Atty:

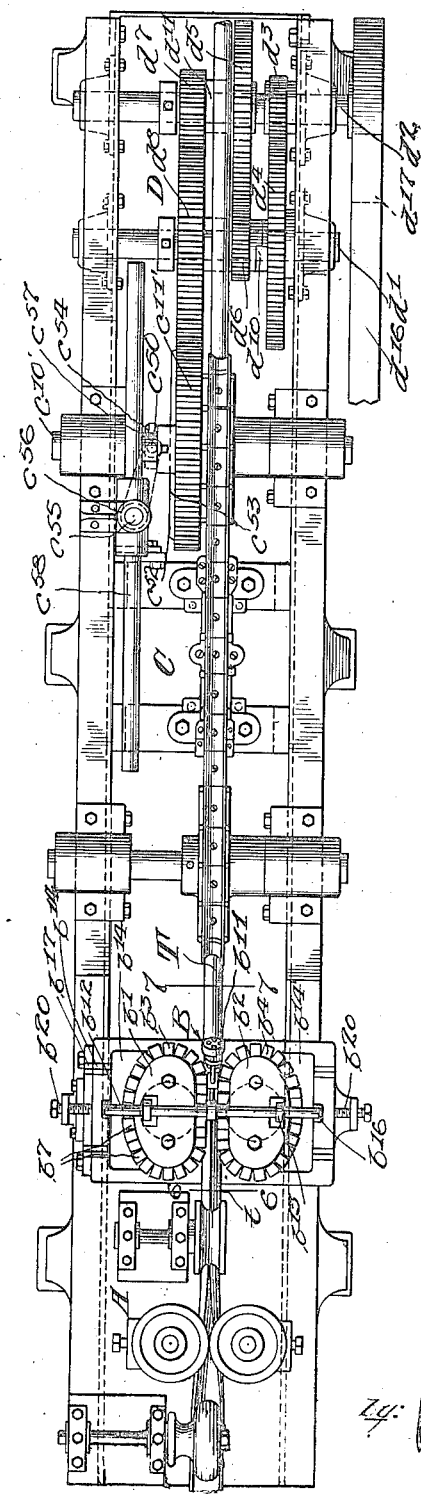

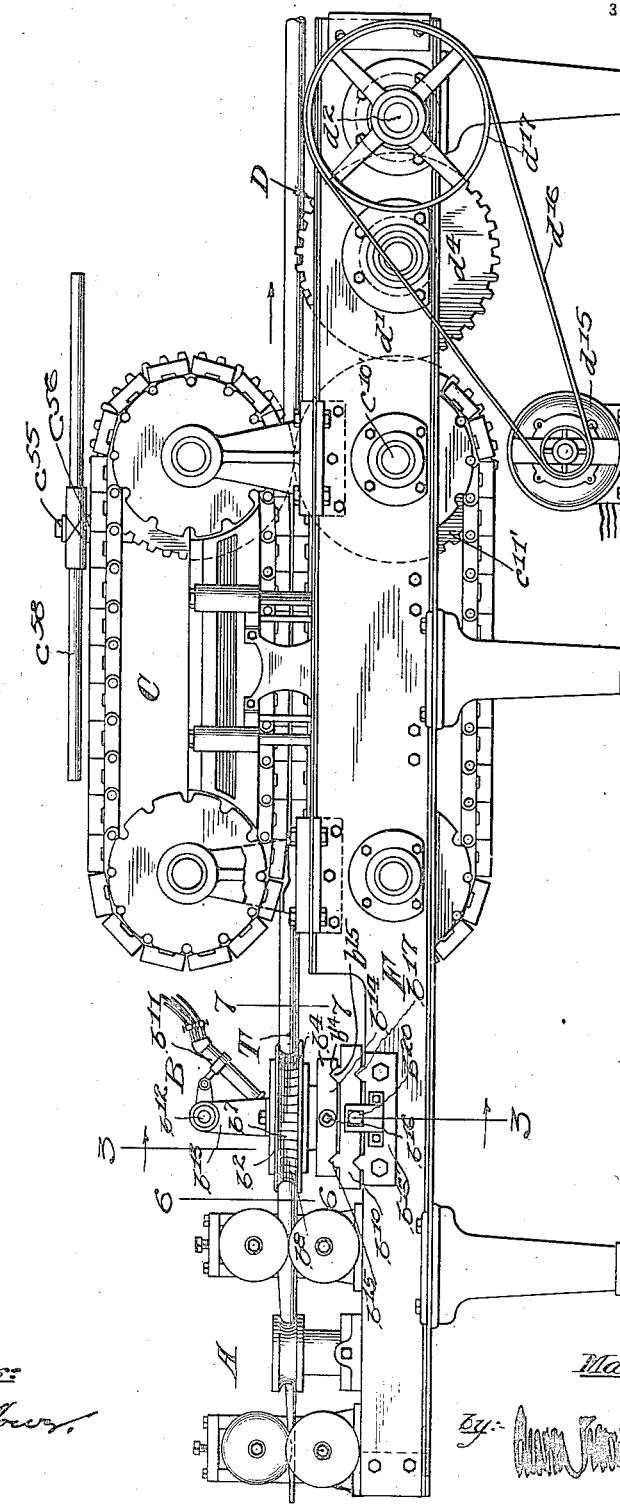

UNITED STATES PATENT OFFICE.

MARSHALL BURNS LLOYD, OF MENOMINEE, MICHIGAN, ASSIGNOR, BY MESNE ASSIGNMENTS, OF ONE-HALF TO THE ELYRIA IRON & STEEL COMPANY, OF ELYRIA, OHIO, A CORPORATION OF OHIO, AND ONE-HALF TO THE STANDARD PARTS COMPANY, A CORPORATION OF OHIO.

WELDING DEVICE.

1,293,486.  Specification of Letters Patent.  Patented Feb. 4, 1919.

Original application filed October 31, 1913, Serial No. 798,559. Divided and this application filed February 23, 1917. Serial No. 150,553.

*To all whom it may concern:*

Be it known that I, MARSHALL B. LLOYD, a citizen of the United States, and a resident of Menominee, county of Menominee, and State of Michigan, have invented certain new and useful Improvements in Welding Devices, of which the following is a specification.

My invention relates generally to mechanism for welding elongated articles of various kinds and relates more particularly to mechanism for continuously welding tubing.

My present application is a division of a prior application, Serial No. 798,559, filed by me October 31, 1913.

The general object of my invention is to provide mechanism wherewith elongated articles such as tubing and the like can be welded more rapidly, more economically, and better than is possible with mechanism hitherto devised.

A further object of my invention is to provide simple and durable mechanism wherewith welded tubing of uniform strength and superficial smoothness can be continuously manufactured.

My invention consists generally in an elongated endless vise formed to hold the work to be operated upon, and other means for moving the work through the vise at a speed determined by the character of the operation to be performed thereon.

My invention consists further in mechanism comprising an elongated endless vise formed to hold work in condition to be operated upon and opposing the movement of the work, and means for drawing the work through the vise, against the opposition thereof, at a substantially constant rate of speed.

My invention consists further in a welding machine comprising an elongated tube-holding vise, consisting of two opposed elements, an endless chain arranged for movement around each of the two opposed elements, portions thereof successively moving into opposed relation and forming an elongated working stretch, said elements as a whole arranged for movement to and from each other, and a welding torch arranged adjacent to the two opposed elements.

My invention consists further in the unique arrangement, construction, and co-operation of parts whereby the objects named above, and others which will appear hereinafter, are attainable, all of which will be more readily understood by reference the accompanying drawings wherein:

Figure 1 is a plan view of mechanism embodying my invention;

Fig. 2 is a side elevation of the mechanism shown in Fig. 1;

Fig. 3 is a cross-sectional view substantially on the line 3—3 of Fig. 2;

Figs. 4 and 5 are respectively detail inner side and end views of the chain and vise block shown in Fig. 3 for gripping the work;

Fig. 6 is an enlarged section of tube on line 6—6 of Fig. 2; and

Fig. 7 is an enlarged section of tube on line 7—7 of Fig. 2.

In the formation of welded tubing a great number of problems are presented, which make difficult the rapid production of tubing which is uniform in strength, finish, size, and gage. A further problem is added when an attempt is made to produce welded tubing continuously and at a rapid rate of speed. I shall limit my discussion here to the manufacture of tubing from strip metal, but this, it should be understood, is done for simplicity in description. In order that the manufacture of such tubing may be better understood, I shall briefly describe the manufacture. The strip metal usually comes from the mills in large bundles. The bundle is placed upon a reel from which it is passed through several dies or rolls, A, which shape the strip metal into the form of a tube. The resulting tube has a longitudinal seam and to weld this seam a portion of the tube must be raised to welding temperature and then subjected to considerable pressure to unite the edges permanently. In practice the tube is often passed through various other mechanisms which act upon the tube. The result of this is that a powerful pull is required to move the tube through these mechanisms and particularly through the tube forming and welding mechanisms. The tube forming and welding mechanisms are in effect elements powerfully resisting the movement of the tube. The result of this resistance is that it is difficult when welding tubing of certain kinds, for instance, thin-walled tubing, to prevent the pulling mechanism from crushing or marring the tube. Since much of the welded tubing is used for purposes where a finished and polished tube is required, any indentation or marring of the surface makes it practically unsalable.

Another difficulty encountered, especially in welding tubing continuously by simply passing under a heating element, is to prevent opening of the welded seam.
It is my purpose to provide mechanism wherewith the difficulties enumerated can be successfully overcome, to the end that uniformly strong and perfect welded tubing can be produced rapidly and economically.
I shall now describe my unique mechanism wherewith the desired results are attainable.

Referring to the drawings, F represents a strong bench or table which serves to support the different mechanisms for acting upon the tube. The bench also usually contains other mechanisms for acting upon the rip metal, such, for instance, as the forming rolls or dies, A. At one end of the table I mount a unique welding device, B, and following this is an elongated cyclic pulling device, C, arranged to receive its motion from speed-reducing mechanism, D. The tube, T, which has been formed by the forming rolls or dies, A, contains a longitudinal seam, $t$, as it approaches the mechanism, B (see Figs. 1 and 3) which is to be closed by welding. For convenience in description, assume that the pulling mechanism, C, is capable of pulling the tube through the forming mechanism and the welding mechanism at a desirable speed and that it does so act. The welding mechanism, B, comprises two opposed elements, $b^1$, $b^2$, around which endless chains or elongated cyclic vises, $b^3$, $b^4$, are arranged to move. The elements, $b^1$, $b^2$, are essentially of the same construction so that a detailed description of one will serve for both. They comprise a body portion, $b^a$, containing an annular or continuous groove, $b^5$. In this groove, $b^5$, an endless chain, $b^6$, is arranged for movement. The chain $b^6$ has fixed thereto a plurality of vise jaws or blocks, $b^7$, the shape of which is determined largely by the shape of the tube or article to be welded. Since I have shown a circular tube in the welding mechanism, I provide the block $b^7$ with a semi-circular recess, $b^8$. In order to lessen the friction caused by the moving chain I interpose between the chain and the body portion, $b^a$, anti-friction rolls, $b^9$. The elements, $b^1$ and $b^2$, are mounted upon a table, $b^{10}$, for movement as will be described in detail hereinafter, to and from each other. By this means any desired pressure may be put upon the tube as it passes therethrough or, in other words, the mechanism, B, as related to the pulling mechanism, C, is adapted to present a resistance of variable magnitude. At the mechanism, B, I arrange means for bringing the portion of the tube adjacent the seam to welding heat as the tube passes therethrough. The tube heating may be accomplished by various means. One very satisfactory means I find to be an oxy-acetylene torch. Hence I have mounted a torch, $b^{11}$, over the tube by means of a cross shaft, $b^{12}$, supported on suitable brackets, $b^{13}$. The torch projects a flame upon the tube, raising the portions adjacent the seam to welding heat, whence they are joined by the pressure of the opposed elements $b^1$ and $b^2$.

It is to be noted that I firmly hold the tube for a considerable length at the welding zone. This I find to be of great utility because after the tube is heated and joined by the means of pressure, it is held for a period sufficient to permit the edges to become firmly set so that when the tube merges it has no tendency to open at the seam. As a result of this I find that I can pass the tube under the welding flame at a greater speed than is possible where the tube is compressed at only a line during the welding operation and with the same torch and the same consumption of gas. Hence the cost of welding tubing is materially decreased with my novel elongated welding vise. Also because the endless chain and vise blocks move when adjusted as hereinafter described, directly with the movable elements, $b^1$ and $b^2$, there is no lost motion between the parts and the tube can be firmly gripped without danger of marring. The chains and connected vise blocks, it will be understood, move continuously and grip successive new portions of the tube. Because of this characteristic I term the vise a cyclic vise.

The elements $b^1$ and $b^2$ are mounted respectively upon movable bases $b^{14}$ which contain V-grooves for coöperation with the V's $b^{15}$ of the table member, $b^{10}$. For moving the bases $b^{14}$ to and from each other I arrange a right and left hand threaded screw $b^{16}$ through both of the bases, so that by simply turning a screw any desired pressure can be put upon the tube.

Since the tube is pulled through the mechanism, B, by means of the pulling device, C, it is desirable and necessary that the working stretch of mechanism, B, be perfectly alined with the working stretch of the pulling device, C, to prevent bending or distortion of the tube. For this purpose I also provide means for moving both the elements, $b^1$ and $b^2$, together without disturbing their relative position. This is accomplished by mounting the base upon another base, $b^{16'}$, which contains V's, $b^{17}$, upon which the table, $b^{10}$, may be shifted as a whole. The table, $b^{10}$, can be shifted by simple adjusting screws, $b^{20}$, arranged at each side for that purpose and perfect alinement of the mechanisms, B and C, is easily secured.

By reference to Fig. 2 it will be seen that the tube-pulling or tube-forwarding device C comprises two endless conveyer chains operable over sprocket wheels, and to each link of the chains is attached a vise jaw. These sprocket wheels are caused to rotate by means of the motor through the gear mechanism D, and it will be observed that the vise jaws as they are carried around by the sprocket wheels gradually and successively approach each other until they grip and substantially inclose all of the tube T.

In the manufacture of tubing, it is often necessary to stop the movement of the tubing for an instant to inspect it or to fix the welding flame or some part of the welding mechanism. This is usually for such a small period that it is not expedient to stop the entire pulling mechanism. For this reason I prefer to provide a separate clutch for connecting and disconnecting the conveyer chains with the driving mechanism, and for this purpose I provide on the shaft, $c^{10'}$, a clutch, $c^{50}$. Fixed to the shaft, $c^{10'}$, is a gear, $c^{11'}$, which engages with one gear of the gearing, D, and whereby it is given its motion. The gear, $c^{11'}$, contains an inner friction surface, $c^{52}$, and for engagement therewith I provide an expanding friction band, $c^{53}$. The band, $c^{53}$, can be expanded by simply shifting the block, $c^{54}$, on the shaft, $c^{10'}$. For shifting the block, $c^{54}$, I provide a stand post, $c^{55}$, vertically supported in suitable bearings, $c^{56}$, at the lower end of which is a fork, $c^{57}$, which engages the block, $c^{54}$. Hence by rotating the standpost, the clutch can be thrown in to start the machine. As considerable friction contact is necessary, I prefer to provide a long leverage for turning the stand-post, and for this reason mount a horizontal pipe, $c^{58}$, at the upper end of the stand post. This forms a convenient means for operating the clutch and one which is easily accessible from any part of the machine and particularly from a position near the welding portion since much of the attention of the operator is directed to that mechanism.

For most welding purposes but a slow constant speed movement of the tube is required, and for this reason a small motor, properly geared, is sufficient to exert the pull required. The driving mechanism, D, is mounted upon cross shafts, $d^1$, $d^2$, and comprises a number of gears, $d^3$, $d^4$, $d^5$, $d^6$, $d^7$ and $d^8$. The member $d^3$ is keyed to the shaft, $d^2$, and meshes with the gear, $d^4$, which is loose upon the shaft, $d^1$, and which imparts motion to the gear, $d^6$, by means of clutch, $d^{10}$. The gear, $d^6$, in turn meshes with the gear, $d^5$, which imparts motion to the gear, $d^7$, by means of the clutch, $d^{11}$, and from the gear, $d^7$, through the gear, $d^8$, the gear member on the shaft $c^{10'}$ is rotated. The shaft, $d^2$, is actuated by the motor, $d^{15}$, through the medium of the belt and pulley, $d^{16}$ and $d^{17}$.

The mechanism here shown and described is adapted successfully to accomplish the objects stated in the opening of the specification, and it is believed that the many advantages thereof will be apparent to those skilled in the art to which it appertains. Since various modifications will readily suggest themselves to others by this disclosure, I do not wish to limit myself to the specific construction and use herein shown and described, except as may be necessary by express limitations in the claims hereunto appended.

I claim:

1. In the machine of the class described, an elongated cyclic vise formed to hold the work in condition to be operated upon, in combination with other means for moving the work through said vise at a speed determined by the character of the operation to be performed thereon.

2. In a machine of the class described, an elongated cyclic vise, formed to hold the work in condition to be operated upon and opposing the movement of the work, and means for drawing the work at a constant rate of speed through said vise against the opposition thereof.

3. In a machine of the class described, an elongated cyclic work holding vise, in combination with an elongated cyclic work-drawing vise operatively alined with the first mentioned vise, and means for operating said drawing vise.

4. In a machine of the class described, an elongated cyclic work-holding vise formed to expose one portion of the work, in combination with an elongated cyclic vise formed substantially to inclose the work and adapted to draw the work through the holding vise, and a torch for operating upon the work at the holding vise.

5. In a device of the class described an elongated cyclic vise comprising two opposed endless chains, in combination with an elongated cyclic pulling vise.

6. In a device of the class described, an elongated cyclic vise comprising two opposed endless elements in combination with a pulling vise comprising two elongated cyclic vise elements.

7. In a device of the class described, an elongated cyclic work-holding vise horizontally disposed, in combination with a cyclic work-pulling vise comprising two elongated endless vise elements.

8. In a welding machine, an elongated work-holding vise comprising two cyclic series, in combination with a work-pulling vise, comprising two opposed vertically disposed cyclic vise elements.

9. In a welding machine, an elongated work-holding vise comprising two opposed cyclic vise elements formed to expose a portion of the work, means arranged at the work-holding vise for heating the work, in combination with a pulling vise formed substantially to inclose the work and progressively to grip new portions thereof.

10. In a welding machine, an elongated work-holding vise, in combination with a work-forwarding vise comprising opposed series of vise jaws, adapted to successively grip the work, and tube heating means at the work-holding vise.

11. In a welding machine, an elongated work-holding vise, in combination with a work-forwarding vise comprising opposed series of vise jaws, adapted to successively approach and grip the work, and means at the work-holding vise for raising the work to welding temperature.

12. In a welding mechanism, the combination of an elongated cyclic work-holding vise comprising two endless chains, a plurality of vise jaws arranged in opposed pairs on the chains, means for raising the work to welding temperature, means for creating desired pressure on the work, and an elongated cyclic pulling vise for pulling the work through said work-holding vise.

13. In a device of the class described, an elongated work-holding vise comprising two cyclic elements, means for moving the cyclic elements to and from each other, means for raising the work to welding temperature, in combination with an elongated cyclic pulling vise alined therewith.

14. In a welding machine the combination of a tube holding vise comprising two cyclic elements movable to and from each other, a torch for raising the tube to welding temperature and an elongated tube forwarding vise for moving the tube through the tube holding vise, and means for alining the tube-holding vise and the tube-forwarding vise.

15. In a device of the class described, the combination of an elongated tube-holding vise comprising two block-like elements, an elongated endless chain arranged to move around each element, a plurality of vise blocks arranged on each chain, the blocks upon one chain opposing those upon the other and shaped to grip the tube with a portion thereof exposed, and a welding torch arranged at the tube holding vise to play a flame upon the exposed portion of the tube.

16. In a welding device, a tube holding vise comprising two opposed elongated elements, an endless chain arranged around each element and carrying a plurality of vise jaws, the vise jaws of respective chains forming opposed pairs shaped to grip the tube through a considerable distance, means for moving the opposed elements bodily to and from each other, and means for raising the tube to welding temperature.

17. In a device of the class described, a tube-holding vise comprising two elongated opposed elements, an endless chain arranged around each element and carrying a plurality of vise jaws, the chains being adapted for cyclic action and adapted to grip a longitudinal portion of the tube with part thereof exposed, means for moving said elements to and from each other, means for raising the tube to welding temperature, in combination with an elongated cyclic pulling vise for moving the tube through said tube holding vise, and means for alining the tube holding vise with the tube pulling vise.

18. In a welding machine, the combination of an elongated cyclic tube-holding vise formed and adapted to expose a portion of the tube, a welding torch arranged adjacent the tube-holding vise and adapted to raise the tube to welding temperature with an elongated cyclic pulling vise, power increasing and speed reducing mechanism for operating the pulling vise, and means for coupling the pulling vise to the driving mechanism.

19. In a welding machine, the combination of an elongated cyclic tube-holding vise, formed and adapted to expose a portion of the tube, a welding torch arranged adjacent thereto and positioned to play a flame upon the exposed portion of the work, an elongated cyclic tube-pulling vise alined with the tube-holding vise, speed reducing mechanism for operating the pulling vise together with clutch mechanism for coupling the operating mechanism to the pulling vise, and a stand post for convenient operation of said clutch.

20. In a welding machine, an elongated tube-holding vise comprising two opposed elements, an endless chain arranged for movement around each of the two opposed elements, portions thereof successively moving into opposed relation forming an elongated working stretch, said elements as a whole arranged for movement to and from each other.

21. In a device of the class described, the combination of two elongated elements mounted for movement to and from each other, annular grooves in each of the elements, a plurality of anti-friction rolls arranged thereon, and endless series of vise jaws arranged around each element and moving on said anti-friction rolls.

22. In a device of the class described, two opposed pressure elements, an endless series of vise jaws arranged on each element and adapted to close in pairs successively upon an object, means for moving the two elements to and from each other together with other means for moving the two elements as an entity.

23. In a device of the class described, two opposed pressure elements, an endless series of vise jaws arranged on each element and adapted to close in pairs successively upon an object, means for moving the two elements to and from each other together with other means for moving the two elements as an entity, and anti-friction rolls interposed between the endless series of jaws and the pressure elements.

24. In a device of the class described, the combination of two opposed pressure elements, an endless recess in each element, an endless cyclic vise element movable around each element, a way for slidably supporting said elements, means for moving the elements to and from each other, a base slidably supporting the way upon which the pressure elements are mounted, and means for moving said base.

25. In a device of the class described, two opposed pressure elements, an endless vise element arranged on each element, anti-friction means interposed between the vise element and the pressure element, means for moving the elements to and from each other, and tube heating means arranged over the two elements, as for the purpose specified.

26. In a machine of the class described, an elongated cyclic vise formed to hold the work in condition to be operated upon, in combination with other means for moving the work through said vise at a speed determined by the character of the operation to be performed thereon.

27. In a device of the class described, the combination of an elongated tube-holding vise comprising two block-like elements, an elongated endless chain arranged to move around each element, a plurality of vise blocks arranged on each chain, the blocks on one chain opposing those upon the other and shaped to grip the tube with a portion thereof exposed, and a welding torch arranged at the tube-holding vise to play a flame upon the exposed portion of the tube.

28. In a welding device, a tube holding vise comprising two opposed elongated elements, an endless chain arranged around each element and carrying a plurality of vise jaws, the vise jaws of respective chains forming opposed pairs shaped to grip the tube through a considerable distance, means for moving the opposed elements bodily to and from each other, and means for raising the tube to welding temperature.

29. In a welding machine, an elongated tube-holding vise comprising two opposed elements, an endless chain arranged for movement around each of the two opposed elements, portions thereof successively moving into opposed relation forming an elongated working stretch, said elements as a whole arranged for movement to and from each other.

30. In a device of the class described, the combination of two elongated elements mounted for movement to and from each other, annular grooves in each of the elements, a plurality of anti-friction rolls arranged thereon, and endless series of vise jaws arranged around each element and moving on said anti-friction rolls.

31. In a device of the class described, two opposed pressure elements, an endless series of vise jaws arranged on each element and adapted to close in pairs successively upon an object, means for moving the two elements to and from each other together with other means for moving the two elements as an entity.

32. In a device of the class described, two opposed pressure elements, an endless series of vise jaws arranged on each element and adapted to close in pairs successively upon an object, means for moving the two elements to and from each other together with other means for moving the two elements as an entity, and anti-friction rolls interposed between the endless series of jaws and the pressure elements.

33. In a device of the class described, the combination of two opposed pressure elements, an annular recess in each element, an endless cyclic vise movable around each element, a way for slidably supporting said elements, means for moving the elements to and from each other, a base slidably supporting the way upon which the pressure elements are mounted, and means for moving said base.

34. In a device of the class described, two opposed pressure elements, an endless vise arranged on each element, anti-friction means interposed between the vise and the pressure element, means for moving the elements to and from each other, and tube-heating means arranged over the two elements, as and for the purpose specified.

In testimony whereof, I have hereunto set my hand this 10th day of February, 1917.

MARSHALL BURNS LLOYD.